Feb. 9, 1960    J. M. HORETH    2,924,810
SEISMIC TRACE TRANSLATION
Filed April 29, 1957    2 Sheets-Sheet 1

John M. Horeth    Inventor
By *James A. Reilly*  Attorney

Feb. 9, 1960 J. M. HORETH 2,924,810
SEISMIC TRACE TRANSLATION
Filed April 29, 1957 2 Sheets-Sheet 2

John M. Horeth  Inventor

By James A. Reilly  Attorney

United States Patent Office 2,924,810
Patented Feb. 9, 1960

2,924,810

SEISMIC TRACE TRANSLATION

John Martin Horeth, Tulsa, Okla., assignor, by mesne assignments, to Jersey Production Research Company Application April 29, 1957, Serial No. 655,694

9 Claims. (Cl. 340—15)

This invention broadly relates to seismic prospecting and more particularly to the translation of recorded seismic signals. The invention especially concerns a system for translating a seismic signal from a recorded trace such that the translated signal is time-corrected for any longitudinal distortions in the trace.

The use of reflection seismic techniques in exploring for petroleum and other subterranean mineral deposits is well known in the art. Very briefly, these techniques utilize a seismic disturbance which is created at a selected point near the surface of the earth. The resulting seismic wave is propagated from the disturbance down into the earth. As the wave encounters discontinuities in the earth's structure, portions of the energy in the wave are reflected back toward the surface of the earth. To detect these reflected waves, a plurality of geophones or other seismic transducers is spaced in a predetermined array extending from the seismic disturbance point. The geophones or other seismic detectors receive the reflected waves and generate trains of electrical signals which are indicative of the frequency and the amplitude of the waves. These signal trains, which are hereinafter referred to as seismic signals, are conveyed to a recording instrument known as a seismograph. Generally speaking, the seismic signal from each separate geophone or detector location is recorded by the seismograph in the form of an individual trace on a seismogram. Most seismographs are capable of recording up to fifty or more separate traces of information; and the traces are generally arranged in a side-by-side relation on a suitable recording medium.

A modern seismograph—in addition to recording the output of a plurality of seismic detectors—also simultaneously records other information such as a standard time signal and the occurrence of the seismic disturbance itself. The time signal, which is a signal of constant predetermined frequency, is desirable from the standpoint that it makes it possible to ascertain the intervals between the seismic disturbance and all of the reflections on the various recorded traces. Generally speaking, most seismographs use a 100 cycles per second (c.p.s.) constant frequency signal as a time standard.

Originally, most seismographs were, in essence, oscillographs which recorded each seismic signal from a geophone as a sinusoidal-type trace. Many of these instruments are still used today. Each trace formed by these instruments is esssentially a rectangular coordinate graph of geophone velocity (or displacement, or acceleration, depending upon the type of geophone used) versus time. A suitable recording device is also provided in these seismographs for recording timing marks on the seismograms produced in response to a signal received from a standard time signal source. Each timing mark usually is a thin line extending laterally across a seismogram so that it intersects each trace on the seismogram.

Recently, it has become increasingly popular to use seismographs which record seismic signals in the form of reproducible traces such as magnetic or photographic traces. These traces are referred to as being reproducible in that it is possible to reproduce the seismic signals recorded on the traces simply by scanning the traces with suitable transducers. The timing signal on a reproducible seismogram is generally recorded—not as a series of marks which cross the seismogram—but instead simply as another trace of information.

Generally speaking, reproducible seismograms are characterized by very little longitudinal distortion. In other words, equal intervals of time along such seismograms are generally represented by substantially equal intervals of length along the seismograms. Constant-speed recording equipment and high-quality recording media generally account for this very desirable condition.

Unlike reproducible seismograms, visual or oscillographic seismograms quite frequently are subject to longitudinal distortions. In other words, equal intervals of time along these seismograms are occasionally recorded along unequal lengths of the seismograms. This lack of fidelity on the part of these records is in some instances due to variations in the recording speed of the seismographs producing them. In other instances, it may be due to shrinkage or warpage of the recording paper or film. The general effect is to distort the wave forms of the seismic signals that are recorded as traces on the seismograms.

Any longitudinal distortions in a seismogram become very important when analyzing the seismogram or when translating the traces that are recorded thereon. This is true regardless of the reproducible or non-reproducible character of the traces. It is particularly true, however, in the case of non-reproducible traces, when it is desired to translate and re-record the seismic signals recorded on the traces.

At this point, it is well to note that the word "translation" as used in this description is intended to mean the technique of generating a signal by scanning along a trace on a seismogram with a suitable translation device. Thus, in the case of a magnetic reproducible trace, the expression is intended to include the technique of scanning the trace with a magnetic-type transducer which is capable of generating an electrical signal in response to variations in the magnetic characteristics of the trace. In the case of a reproducible photographic trace such as a variable density trace, the expression is intended to embrace the techniques of: (1) scanning the trace with a light beam and a device such as a photoelectric cell which is capable of generating a train of electrical signals in response to variations in the intensity of the light projected through the trace and (2) scanning the trace with a light beam and projecting the trace from the seismogram onto a photographic film or other suitable recording medium.

In the case of a visual non-reproducible oscillographic trace, the expression "translation" is intended to mean the technique of scanning the trace with a laterally displaceable stylus or equivalent means whose movements can be converted into a recordable signal. As will be apparent to those skilled in the art, lateral displacements of the stylus for example may be used to actuate a positional servo motor whose movements generate an electrical signal corresponding in its characteristics to the wave form of the oscillographic trace.

In short, then, the term "translation" as used in this description is intended to mean any system of reproducing or regenerating a seismic signal which has been recorded as a seismic trace on a seismogram. It is immaterial, really, whether the trace is reproducible or non-reproducible.

Before proceeding further with the description of the present invention, it is again well to note that the term "seismic signal" as used in this description is intended to mean a train of electrical signals such as is generated by a geophone or other seismic transducer in response to the reception of seismic wave energy. The expression is intended to mean not only "original" seismic signals which have been generated directly by geophones but also "translated" signals which have been obtained by translating the traces on a seismogram.

It is a general object of the present invention to provide a system of translating a seismic signal from a trace on a seismogram wherein distortions in the translated signal, which would otherwise be caused by distortions along the trace, are reduced. It is a more particular object of the invention to reduce continuously and automatically any time distortions within a translated seismic signal directly as the signal is translated from a seismic trace. It is another object of the invention to facilitate the translation of seismograms in general and to improve the fidelity of the seismic signals that are thereby obtained.

These and related objects of this invention, which will be expressly described or readily apparent in the following discussion, are realized in accordance with the invention by retarding or advancing a translation device longitudinally relative to a seismogram directly while the device is scanning and translating a trace on the seismogram so as to reduce the adverse effects caused by longitudinal distortions in the seismogram.

More particularly, the invention utilizes a multi-step cam wherein the individual steps of the cam are adjustable in rise or fall relative to the base line of the cam. The base line of the cam is likened to absolute time along the length of a seismogram; and the displacements along the cam are likened to longitudinal distortions that exist along the seismogram.

The cam is provided with a cam follower which scans along the contour of the cam simultaneously with movement of the translation device along a trace on the seismogram. In the absence of any longitudinal distortions in the seismogram, the cam follower and the translation device scan along the cam contour and the seismogram in unison. If longitudinal distortions exist at any points along the seismogram, however, lateral displacements of the cam at corresponding points along the cam cause the translation device to experience a secondary longitudinal displacement relative to the seismogram—a displacement which is over and above its normal longitudinal movement with respect to the seismogram. Thus, if a particular section of the seismogram is shorter than normal in that it represents a disproportionately greater length of time than it should, the translation device scans this section of the seismogram at a slower rate than it normally would. Conversely, if a particular section of the seismogram represents a shorter time interval than its length normally should, the translation device scans this section of the seismogram at a faster rate than it normally would.

Expressed otherwise, the present invention utilizes a cam whose base line is indicative of absolute time and therefore proportional in its length to the length of a trace along a seismogram which is free of longitudinal distortion. The cam is provided along its length with a plurality of steps at positions corresponding to similar positions along the length of the seismogram. After the degree of longitudinal distortion at each one of the points along the seismogram has been established, the steps at the corresponding points along the cam are moved laterally relative to the base line of the cam distances which are proportional to the longitudinal distortions. Preferably, a uniform-motion cam is employed, a preference which is based on the observation that distortion along a seismogram is usually substantially linear between relatively narrow limits. Other types of cams may be employed as desired, but it has been found thus far that a uniform- or linear-motion cam has been entirely suitable for virtually all types of conventional seismograms.

Having made the base line of the cam proportional to absolute time along a seismogram (free of longitudinal distortions), and having made the displacements of the cam along its length proportional to longitudinal distortions along the seismogram, it will be apparent that a cam follower traveling along the contour of the cam: (1) travels longitudinally a distance proportional to undistorted time, and (2) travels laterally a distance proportional to distorted time. Furthermore, it will be apparent that lateral motion of the cam may be added to or subtracted from the longitudinal motion. The total travel of the cam follower (both longitudinally and laterally) is therefore proportional to the distorted time indicated simply by the length of a seismogram. Through suitable motion-translation means, lateral displacements of the cam are translated into longitudinal displacements of a translation device scanning a trace on the seismogram. The scanning motion of the latter device is therefore continuously and automatically corrected for distortions in the seismogram.

At this point, it is well to note that most visual non-reproducible oscillographic seismograms are recorded at speeds of 10 to 15 inches per second and represent a total of about 2 to 5 seconds of recording time. Seismograms of this type are usually from about 24 to 80 inches long. Reproducible seismograms usually represent about 4 to 5 seconds of recording time per observation at a speed of about 3 to 7 inches per second. These seismograms are generally about 15 to 40 inches long.

The invention may be better understood by reference to the attached drawing in which—

Figure 1:
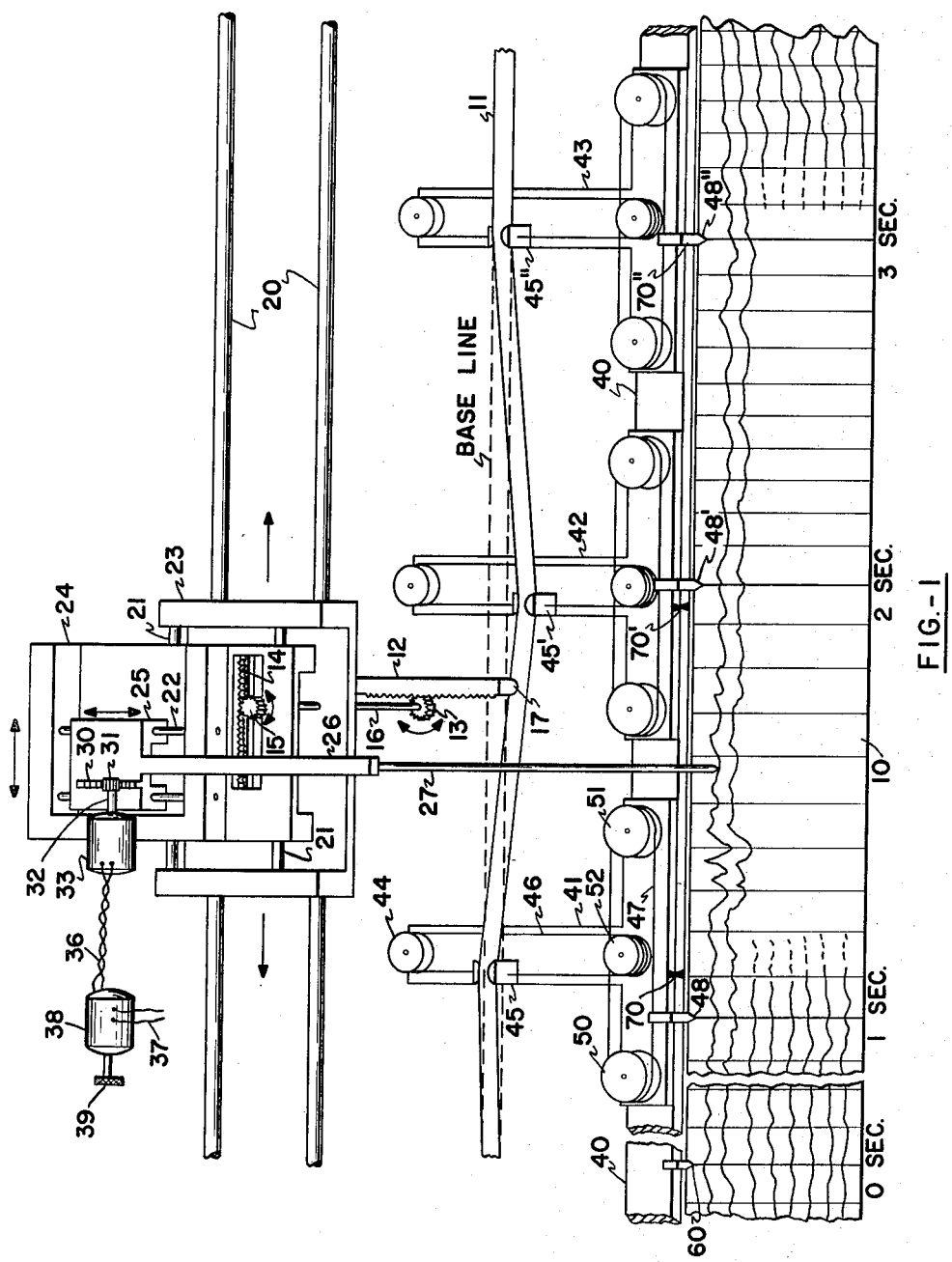
Figure 1 is a fragmentary diagrammatic perspective view of an apparatus embodying the principles of this invention.

Turning to the drawing, it will first be noted that the apparatus shown there is intended primarily for use in translating non-reproducible seismograms wherein the individual traces are recorded by means of conventional seismic oscillographs. The individual traces are sinusoidal in appearance and are formed by a recording pen or a beam of light reflected from the mirror of a galvanometer.

Figure 2:
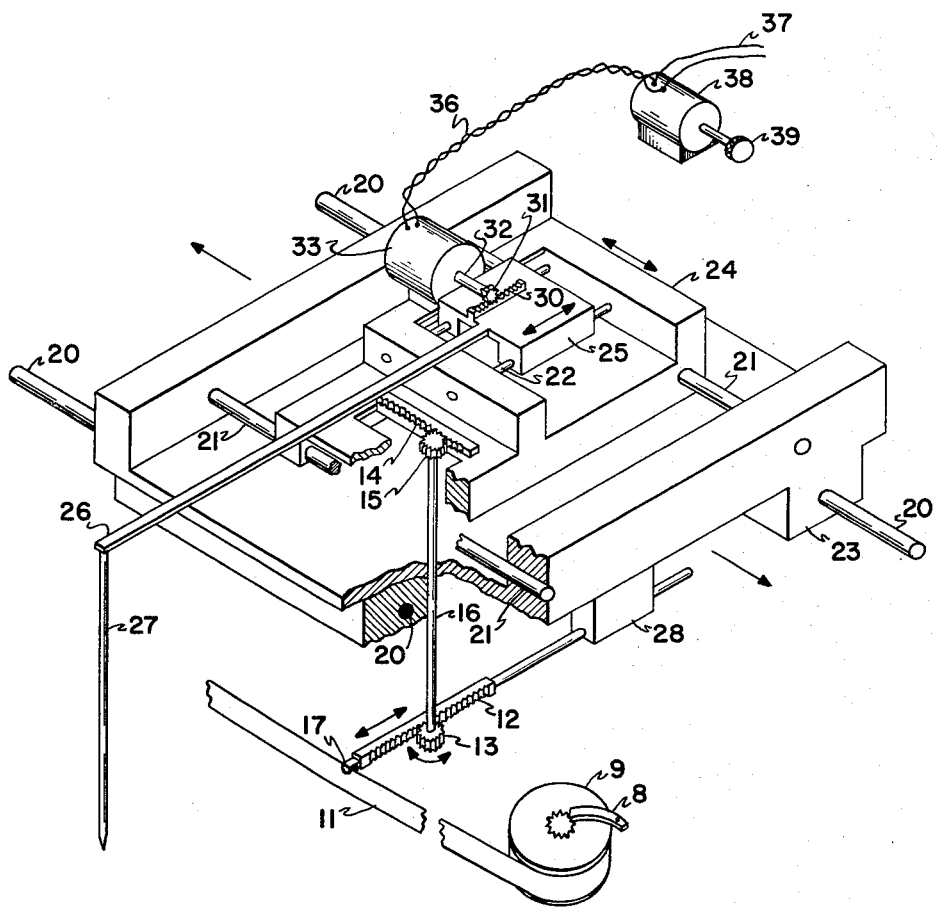
Figure 2 is another fragmentary and diagrammatic perspective view of the apparatus shown in Figure 1—in this instance taken from a slightly different angle than that in Figure 1.

Referring, then, to Figures 1 and 2, the following items are among those common to both figures: tape 11, lower rack 12, lower pinion gear 13, upper rack 14, upper pinion gear 15, pinion shaft 16, and cam follower 17. Also common to both figures are lower carriage bars 20, upper carriage bars 21, transverse carriage bars 22, lower carriage 23, upper carriage 24, transverse carriage 25, stylus arm 26, and stylus 27. Other common items include rack 30, pinion gear 31, shaft 32, positional servomotor 33, and signal generator 38.

Referring specifically to Figure 1, the following additional items are illustrated: seismograph 10, calibrated reference bar 40, and pulley assemblies 41, 42, and 43. Each pulley assembly comprises four pulleys, a pulley support member, an index member, and a tape clamp. Referring specifically to pulley assembly 41, for example, its components are identified as follows: longitudinal pulleys 50 and 51, translation pulley 52, lateral pulley 44, and clamp 45. Also included in this pulley assembly are cable 46 and index member 48.

Shown in Figure 2 is tape wind-up reel 9 provided with ratchet locking mechanism 8. The opposite end of the tape may simply be fixed to a suitable support member such as the general supporting structure.

No general supporting structure has been illustrated in either Figure 1 or Figure 2 in order to keep these figures as simple and easy to understand as possible. It will be understood, however, that carriage rods 20, as well as the pulley support members, reference bar 40 and the seismogram 10 should be placed on suitable supporting means. Furthermore, it is preferred that the supporting means for the seismogram 10, as well as the reference time bar 40, be adapted to permit longitudinal adjustments in the positioning of these members. It is also preferred that lateral adjustments be possible between the carriage bars 20 and the seismogram 10 in order that stylus 27 be capable of scanning each one of the traces on the seismogram. All of these features will be readily apprehended by persons skilled in the art and easily realized, so that a detailed discussion of the features is felt to be unnecessary.

To further simplify this description, it will be assumed that the apparatus shown in Figures 1 and 2 is adapted to process seismograms which have been recorded at rates expressed in terms of inches per second. When handling seismograms of this type, it is preferred that the time reference bar 40 be provided lengthwise with a scale calibrated in inches. Then, by knowing at which rate a seismogram was supposedly recorded, one can readily translate inches along the reference bar into seconds of recording time.

The zero inch index on the bar (corresponding to zero time and represented by legend 60) is conventionally placed laterally opposite the assumed zero time mark on the seismogram. Then, and as will be more apparent later in this description, the remaining index members on the pulley assemblies—i.e., members 48, 48', and 48"—are preferably placed directly opposite time lines on the seismogram corresponding to even seconds of recording time, or multiples or fractions thereof. Thus, it is assumed that index member 48 in Figure 1 is opposite the time line denoting one second on the seismogram 10 and that the index members 48' and 48" are positioned opposite the two-second and three-second time lines, respectively.

For the sake of illustration, it is further assumed in Figure 1 that longitudinal distortion of seismogram 10 exists at the one- and two-second time lines, but that no distortion exists at the three-second time line. In other words, the distortions existing up to the three-second line effectively cancel one another at that time line.

The pulley assemblies 41, 42, and 43 are constructed such that the contact point between each tape lock (e.g., lock 45) and the tape 11 is aligned with an index mark (e.g., mark 70) on the pulley assembly. Referring specifically to clamp 45, for example, this clamp holds the tape 11 in a neutral lateral position when the index member 48 is directly over the index mark 70. If the index member is not directly over its particular index mark, then its particular clamp is laterally displaced from its neutral point. Thus, in Figure 1, index member 48" is aligned with its clamp 45", while index members 48 and 48' are positioned on either side of their clamps 45 and 45', respectively.

The index member in each pulley assembly is attached to its respective cable. For example, index member 48 in assembly 41 is attached to cable 46. This cable winds around pulleys 50 and 51 to effect longitudinal movement of index member 48; and it further loops around translation pulley 52 and lateral pulley 44 so that longitudinal movements of the index member result in corresponding lateral movements of clamps 45. Expressed otherwise, pulley assembly 41 converts longitudinal displacements of index member 48 from the index mark 70 into lateral displacements of the clamp 45 from a predetermined neutral position for the clamp.

At this point, it will be noted that tape 11 in effect forms an elongated uniform-motion cam which is locked at each end (as by means of ratchet 8) when the apparatus of the figures is in operation. One end of the tape is free while adjustments of its clamps are made. Once made, however, the end is once more locked.

The base line of the tape cam passes through the neutral lateral position of the clamp in each pulley assembly. These neutral positions are selected such that tape 11 is parallel to the length dimension of seismogram 10 when all of the clamps are at equal lateral displacements. In other words, when all of the clamps are in their neutral lateral positions, tape 11 is in its cam base line position; and it defines a straight line which is parallel to the length dimension of seismogram 10 and also to the longitudinal motion of the translating device which scans the seismogram.

As noted earlier herein, clamp 45" in Figure 1 is the only clamp which is positioned at its neutral lateral point; and the tape 11 is colinear with the base line of the cam defined by the tape at this point. Clamp 45 is displaced to one side of the base line of the cam 11, and clamp 45' is displaced to the opposite side of the base line.

A bifurcated member 17 defines a cam follower which is adapted to follow along the upper edge of the tape 11. As shown in Figure 2, the cam follower is attached to a rack 12 that is slidably supported at its opposite end within a depending projection 28 which is fastened to or integral with lower carriage member 23. Lateral movement of follower 17 therefore causes a corresponding lateral movement of rack 12. The latter member in turn causes pinion gear 13 to rotate, thereby rotating pinion rod 16 and upper pinion gear 15. Rotation of the upper pinion gear causes rack 14 to move—the motion of the latter rack being at right angles to the motion of the lower rack 12.

Upper rack 14 is integral with or mounted securely to upper carriage member 24, with the result that longitudinal movements of the rack cause the upper carriage member to slide along the upper carriage bars 21.

Transverse carriage member 25 is slidably supported by means of lateral cross bars 22 which in turn are supported by upper carriage member 24. The lateral carriage member 25 is thus free to move laterally with respect to the upper carriage member—it being assumed, of course, that all longitudinal movements are considered to be in the same direction as the longitudinal dimension of the seismogram 10.

A stylus support bar 26 is supported in a cantilever manner from the lateral carriage member 25. Stylus 27 is secured to the stylus support 26 at its outer end, and the stylus depends vertically toward the seismogram 10.

It will be apparent at this point that stylus 27 is capable of longitudinal movement along the seismogram 10 by virtue of its being supported indirectly from the lower carriage member 23, which is capable of sliding longitudinally along the carriage bars 20. Stylus 27 is also capable of lateral motion relative to the seismogram, and this lateral motion is translated into rotary motion by virtue of the rack 30 and pinion gear 31. Pinion gear 31 is mounted on shaft 32 which is rotated by positional servo motor 33. The motor is mounted on the upper carriage member 24 conveniently as shown, and it is driven by signals received from generator 38.

A handwheel 39 attached to generator 38 enables an operator to actuate the generator and to thereby also actuate the motor 33. Movement of the handwheel in one rotary direction causes stylus 27 to move in one lateral direction. Conversely, movement of the handwheel in an opposite rotary direction causes the stylus to move in an opposite lateral direction. An operator therefore may cause the stylus to follow all of the undulations in a trace on a seismogram simply by turning the handwheel 39 in the proper directions as the stylus scans along the trace. Simultaneously, the train of signals generated by the generator 37 may be conducted through electrical circuit means 37 to any suitable recorder or other equipment as desired. It will be recognized that the train of signals is in actuality the seismic signal recorded on the seismogram trace. The signal is preferably re-recorded on an appropriate recording medium.

It is necessary, of course, that means be provided for enabling stylus 27 to travel longitudinally relative to the seismogram in order to scan a trace on the seismogram 10. This type of movement is most conveniently provided by driving the lower carriage member 23 along the guide rods 20 as by means of a lead screw or a pulley and belt system and a drive motor. None of these devices is shown; but they are well-known items in the art, and their inclusion in the drawing is therefore felt to be unnecessary.

As mentioned above, seismic signals generated by the generator 38 may be handled as desired. For example, it is contemplated that these signals may be transmitted to a conventional seismic recorder, where a seismogram may be reconstructed in which the seismic traces are free of longitudinal distortions. It is also contemplated that the individual traces may be corrected for static and dynamic seismic corrections, whereby a corrected seismic section may be constructed from the traces. The exact use to which the signals from the signal generator is put is not vital insofar as the present invention is concerned. Instead, it is the object of the invention to provide a system for assuring that the signals generated by the motor are corrected for any longitudinal distortions that exist in their recorded trace form on the seismogram 10.

Having briefly identified and described the structural components of the apparatus in the drawing, attention is now directed toward a discussion of the manner in which the apparatus is preferably operated.

First, a seismogram such as that identified by the legend 10 in Figure 1 is placed on a suitable support member alongside the reference time bar 40. The seismogram is aligned with the time bar so that the zero or reference time line on the seismogram is laterally opposite the zero time index 60 on the time bar.

Next, the index members 48, 48', and 48", etc., are positioned laterally opposite predetermined points along the seismogram. As explained earlier in this discussion, it will be assumed for the present purposes of description that the index members are placed opposite complete second intervals along the seismogram. This step in the procedure may be better understood by assuming a set of conditions in which the seismogram 10 was recorded at a rate of ten inches per second and with ten time lines per second. Then, in Figure 1, the distance along the time bar 40 from index 60 to the first index mark 70 is ten inches. The distances between subsequent time marks is also ten inches. Furthermore, there are ten time lines for every second of travel along the seismogram.

At this point, it is well to note that the zero time line on a seismogram is generally taken as the time line nearest to the "break-time" indication on the seismogram. This indication corresponds to the instant at which the shooting circuit was broken following the detonation of a seismic charge.

Referring now to Figure 1, it will be quite apparent that longitudinal distortion of the seismogram 10 exists at the one- and two-second time lines. No distortion exists at the three-second line. Therefore, in accordance with the invention, index member 48 is moved longitudinally along the seismogram until it is opposite the one-second time line; and index member 48' and 48" are positioned opposite the two- and three-second time lines, respectively.

Simultaneously with longitudinal movements of the index members, the tape clamps 45 and 45' are given lateral displacements which are equal, in each instance, to the longitudinal displacements of the index members 48 and 48' from their respective index marks. Summarizing momentarily, then, index member 48" is precisely opposite its three-second time line, with the result that its clamp 45" is positioned directly at its neutral point along the base line of the cam 11. Clamps 45 and 45', however, are displaced on each side of the base line because of the longitudinal distortions in the seismogram at the one- and two-second time lines.

With the seismogram 10 mounted in the position just described, and with the index members 48, 48', and 48" positioned as described, stylus 27 is pointed at a particular trace on the seismogram; and a scanning operation is started from the zero time line on the seismogram. The lower carriage member 23 is moved along the carriage rods 20, and stylus 27 is moved laterally by means of handwheel 39 to follow oscillations in the trace. A train of electrical signals is generated by the generator 38 which is, in effect, the seismic signal originally recorded on the seismogram trace.

Cam follower 17 moves along the contour of cam 11 concurrently with the movement of stylus 27 along the seismogram trace. In addition, cam follower 17 moves laterally relative to the base line of the cam in accordance with the positions of the clamps 45, 45', 45", etc. The lateral displacements of the cam follower cause the lower rack 12 to move laterally and to thereby impart rotational motion to the shaft 16 through pinion gear 13. The direction of rotation depends upon the direction in which the rack 12 is moving at any given time.

Rotational movement of shaft 16, as indicated earlier, imparts a longitudinal motion to upper rack 14 by means of upper pinion gear 15. Thus, this rack and pinion gear assembly serves to translate lateral motions of the cam follower 17 into equal longitudinal motions of the rack 14. The latter rack—being integral with or secured to upper carriage member 24—causes carriage member 24 to move longitudinally relative to the seismogram 10. Thus, upper carriage member 24 experiences a longitudinal movement which is equal to the longitudinal movement of the cam follower 17—plus or minus the lateral displacement of the cam follower relative to the base line of the cam 11. If a given section of the seismogram is unduly long, the stylus 27 and carriage 24 are advanced at a faster than normal rate, with the result that the wave form generated by the generator 38 is effectively compressed along its time axis. Conversely, if a section of the seismogram is shorter than normal, stylus 27 is retarded in its rate of movement along the seismogram; and the wave form generated by generator 38 is effectively elongated along its time axis. Accordingly, longitudinal distortions in the seismogram are compensated for when translating signals from the seismogram.

It will be recognized that it is generally preferred to have the lower carriage member 23 move at a substantially constant rate of speed along the carriage rod 20. This condition, however, is not always necessary, depending upon the use to which the signals from the generator 38 are to be put.

It is also generally preferred that the index members 48, 48', 48", etc., be generally positioned at equal time intervals along a seismogram. It will be recognized, however, that unequal spacings may also be used if so desired. Furthermore, the apparatus may be readily adapted to seismograms recorded over a wide range of recording speeds.

While the apparatus described and illustrated in the drawing represents the best apparatus contemplated for carrying out this invention, it will be recognized that numerous modifications and variations may be employed without departing from the spirit or scope of the invention. For example, it is contemplated that motion-translation means other than pulley assemblies may be used for converting longitudinal displacements of the index members on the time bar into lateral displacements of the tape clamps. Furthermore, motion-translation means other than the rack and pinion gear assembly may be used for converting lateral displacements along the cam into longitudinal displacements of the stylus.

It will also be recognized that the apparatus of this invention may be readily adapted to other geometric forms. For example, it is contemplated that the seismograms may be mounted on a cylindrical drum, in which event it is preferred to use a rotary cam in place of the elongated cam 11. It is also generally preferred in such a structure to rotate or move the seismogram relative to the stylus 27 and to move the stylus longitudinally merely to effect the corrections required for any longitudinal distortions.

Again, while it is generally preferred to mount the time bar, the seismogram, the cam, and the other components in a parallel side-by-side relation, it will be recognized that this type of juxtaposition for these members is now always critical in this invention. The particular arrangement shown, however, is believed to be unique in its compactness, efficiency, and simplicity.

The invention claimed is:

1. An improved apparatus for translating a seismic signal from a trace recorded on a seismogram wherein reference timing recordations on the seismogram are unequally spaced from one another although recorded at equal time intervals, which comprises: mounting means adapted to support said seismogram, a time scale adapted to be positioned alongside the seismogram, equally spaced recordations extending along said time scale, corresponding lengths of said time scale and said seismogram having an equal number of recordations, means to align the reference time mark on the seismogram with a mark near one end of said time scale, a multi-step uniform-motion elongated cam adapted to be positioned alongside said time scale with its base line parallel thereto and with each step laterally adjacent a separate time mark on said scale, each step laterally adjustable relative to said base line, a cam follower adapted to follow said cam, translation means adapted to scan along the trace on said seismogram, drive means adapted to effect simultaneous movement of said cam follower and said scanning means, and rack and pinion means traveling with said drive means responsive to each lateral displacement of said cam follower along said cam to displace said translation means longitudinally relative to said seismogram a distance equal to said lateral displacement.

2. In an apparatus for translating a seismic signal from a seismic trace on a seismogram including mounting means for supporting the seismogram, translation means for scanning along the trace and drive means to effect scanning movement of said translation means, the improvement which comprises a time scale divided longitudinally into a plurality of segments having equal lengths, index means adapted to divide said trace lengthwise into a corresponding plurality of segments of equal time duration, an elongated uniform-motion multi-step cam, the steps being equally spaced along the base line of the cam and being laterally adjustable relative to the base line, a cam follower adapted to move along the cam, and motion-transfer means responsive to lateral displacements of said cam follower to effect a longitudinal displacement of said translation means relative to said seismic trace.

3. In an apparatus for translating a seismic signal from a seismic trace recorded on a seismogram including mounting means for supporting the seismogram, translation means adapted to scan along the trace and drive means to effect the scanning movement of the translation means, the improvement which comprises a plurality of index means spaced along the seismic trace from a reference time point on the trace to divide the trace into segments of equal recording time duration, a multi-step uniform-motion cam, the steps of said cam being laterally adjustable relative to the base line of the cam, said steps being equally spaced along the length of the cam, successive steps of the cam corresponding to successive index means along the seismogram, the distance between successive steps along said cam being proportional to a predetermined portion of the length of said trace, the lateral displacement of each step of the cam being proportional to the difference between the distance from said reference time point to the step and the distance from said reference time point to the index means corresponding to the step, a cam follower adapted to follow along said cam simultaneously with the scanning movement of said translation means, and connection means responsive to each lateral displacement along the cam to longitudinally displace the translation means relative to the seismic trace a distance proportional to the lateral displacement of the cam follower, the displacement of said translation means being such as to enable the translation means to scan past each index means along the seismogram at the same instant that the cam follower passes the corresponding step along the cam.

4. In an apparatus for translating a seismic signal from a seismic trace recorded along a seismogram including mounting means for supporting the seismogram, translation means adapted to scan along the trace and drive means to effect the scanning movement of the translation means, the improvement which comprises a cam with a base line proportional in length to time along the seismic trace, points along the contour of the cam being laterally displaceable distances proportional to the longitudinal time distortions at corresponding points along the seismic trace, a cam follower adapted to follow along the contour of the cam, and motion-translation means responsive to each lateral displacement of the cam follower to effect a proportional longitudinal displacement of the translation device at the corresponding point along the seismic trace, the direction of longitudinal displacement being such as to position the translation device at a point in time along the seismic trace corresponding to the position of the cam follower along the base line of the cam.

5. An apparatus as defined in claim 4 in which the cam is a uniform-motion, multi-step cam.

6. An apparatus as defined in claim 5 in which the cam is an elongated cam.

7. In an apparatus far translating a seismic signal from a seismic trace recorder along a seismogram including translation means adapted to scan along the trace, the improvement which comprises a uniform-motion, multi-step elongated cam whose length is proportional to time along the seismic trace, each step of the cam being adjustable in displacement to correspond to the time distortion existing in the seismic trace at a corresponding point in distance along the trace, a cam follower adapted to move along the contour of the cam, drive means adapted to advance the translation device and the cam follower along the seismic trace and the cam base line, respectively, at corresponding rates, and motion-translation means responsive to each lateral displacement of the cam follower to effect a longitudinal proportional displacement of the translation device, said motion-translation device advancing the translation device relative to the cam when the cam is preceding the translation device and retarding the translation device when the cam is trailing the translation device.

8. An apparatus as defined in claim 7 in which the motion translation means comprises combination rack and pinion means.

9. In an apparatus for translating a seismic signal from a trace recorded at a predetermined approximate number of linear units of measure per second along a seismogram including translation means adapted to scan along the trace, the improvement which comprises an elongated reference member positioned alongside the seismogram and parallel to the time axis of the seismic trace, said reference member being calibrated along its length in said units of linear measure, means to position the calibration mark at one end of the reference member laterally opposite the zero time mark on the seismic trace, a plurality of index devices movable and spaced along the reference member, each index device in a neutral position being spaced from the zero calibration mark a distance corresponding to the length of the seismic trace that would have been formed on the seismogram during a predetermined interval of recording time relative to the zero time mark, adjustment means to move each index mark in either longitudinal direction from its neutral position to a point laterally opposite the time line denoting the actual length of the seismic trace that was recorded during said time interval, an elongated cam positioned alongside the reference member and with its base line parallel to the time axis of the seismic trace, motion-translation means connected to each index device to displace the contour of the cam laterally opposite the neutral point of the index device a distance equal to the longitudinal displacement of the index device from its neutral point, the direction of displacement of the cam contour being to a first side of the cam base line when the index device is displaced toward the zero time mark and to the opposite side of the base line when the index device is displaced away from the zero time mark, the contour of the cam being uniform-motion in character between successive index devices, a cam follower adapted to travel along the contour of the cam, drive means adapted to move said cam follower along the contour of the cam and the translation device along the seismogram trace at corresponding rates when the contour of the cam is parallel to the time axis of the seismic trace, and motion-translation means responsive to the lateral displacement of the cam follower at each point along the contour of the cam to longitudinally displace the translation device a distance equal to the lateral displacement of the cam, the longitudinal displacement of the translation device being toward the zero time mark when the displacement of the cam contour is toward said first side of the cam base line and away from the zero time mark when the displacement of the cam contour is toward the opposite side of the cam base line.

References Cited in the file of this patent

UNITED STATES PATENTS

| | | |
|---|---|---|
| 2,638,671 | Ramsey | May 19, 1953 |
| 2,712,694 | Herbold | July 12, 1955 |
| 2,821,892 | Merten | Feb. 4, 1958 |